US 6,668,658 B2

(12) United States Patent
Woersinger et al.

(10) Patent No.: US 6,668,658 B2
(45) Date of Patent: Dec. 30, 2003

(54) PRESSURE SENSOR MODULE

(75) Inventors: Juergen Woersinger, Maulbronn (DE); Martin Mast, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/149,810

(22) PCT Filed: Oct. 19, 2001

(86) PCT No.: PCT/DE01/03990

§ 371 (c)(1),
(2), (4) Date: Aug. 26, 2002

(87) PCT Pub. No.: WO02/33375

PCT Pub. Date: Apr. 25, 2002

(65) Prior Publication Data

US 2003/0056596 A1 Mar. 27, 2003

(30) Foreign Application Priority Data

Oct. 20, 2000 (DE) .......................................... 100 52 406

(51) Int. Cl.[7] ................................................. G01L 9/00
(52) U.S. Cl. ......................................................... 73/723
(58) Field of Search ............................... 73/706, 40, 45, 73/714, 715–727, 756; 37/45, 513.5, 543

(56) References Cited

U.S. PATENT DOCUMENTS 5,621,176 A    4/1997  Nagano . ...................... 73/714

FOREIGN PATENT DOCUMENTS

GB          2 264 070 A      8/1993

OTHER PUBLICATIONS

Patent Abstracts of Japan vol. 009, No. 206 (M–406$_{13}$, Aug. 23, 1985 & JP 60 065974, Apr. 15, 1985.

Primary Examiner—William Oen
(74) Attorney, Agent, or Firm—Michael J. Striker

(57) ABSTRACT

A pressure sensor module for measuring a differential pressure has a sensor chip for measuring a differential pressures and a module housing with at least two lead lines that are disconnected from one another by the sensor chip and in which lines differential pressures are at least intermittently present, wherein in at least one lead line a valve is disposed that closes the lead line when the sensor chip no longer disconnects the lead lines from one another.

12 Claims, 3 Drawing Sheets

PRESSURE SENSOR MODULE

BACKGROUND OF THE PRIOR ART

The invention is based on a pressure sensor module for measuring a differential pressure.

In sophisticated engine control systems, the fuel pressure is regulated in order to reduce fuel heating and to lessen the emissions of fuels. With the aid of a fuel pressure sensor, the difference between the fuel pressure and the intake tube pressure is measured. Currently, silicon-based micromechanical sensors are used as economical fuel pressure sensors. In them, one side of a diaphragm, remote from a circuit, is subjected to fuel, and one side of the diaphragm, toward the circuit, is connected to the intake tube. If the sensor diaphragm breaks because of mistakes in production or handling, the fuel will be pumped through the burst diaphragm directly into the intake tube, where it can cause destruction of the engine from fuel impact.

Differential pressure sensors are known that on a compression side additionally have a metal diaphragm, upon which the pressure is exerted and which transmits this pressure to the sensor diaphragm via a silicone oil. If the diaphragm of the sensor breaks from an overload, the metal diaphragm presses against a support face that is provided and absorbs the pressure, so that the medium on the compression side cannot get into the sensor housing and/or into the region of the other compression side. Only a slight quantity of the silicone oil that is present reaches the inside of the intake tube.

However, because of their complicated structure for the metal diaphragm and the embodiment of the hermetically sealed volume for the silicone oil, these sensors are expensive. This is due to the material and process costs for the connection technology, the oil filling, and calibration after the oil filling has been done. To meet the required precision, a minimum size of the metal diaphragm and thus also a corresponding structural size are required, which is a hindrance to miniaturization.

From British Patent GB 2264070 A1, a device is known that has a differential pressure sensor and a valve that can close a lead line to the differential pressure sensor. This can be done only via an electronic controller.

SUMMARY OF THE INVENTION

In keeping with these objects, a pressure sensor module in accordance with the present invention has a sensor chip for measuring a differential pressure and a module housing having at least two lead lines that are disconnected from one another by the sensor chip, and different pressures are present in the lines at least intermittently wherein in accordance with the present Invention in at least one lead line a valve is disposed that closes these lead lines when the sensor chip no longer disconnects the lead lines from one another.

The pressure sensor module of the invention has the advantage over the prior art that in a simple way, a transfer of a medium from one lead line to another lead line is prevented, and this is accomplished independently of the pressure and independently of the flow of the medium.

One advantageous feature of a valve is attained by providing that a lift body is disposed between two constrictions of a lead line and closes this lead line by pressing against one constriction, if a sensor chip no longer disconnects the lead lines from one another.

A constriction can advantageously be formed by a perforated grid.

As the lift body, a ball with a smaller cross section than the lead line is advantageously used.

An advantageous embodiment of the invention is recited in claim 6, in which the pressure sensor module is connected to an intake tube of an internal combustion engine and to a fuel line.

It is advantageous if the pressure sensor module is installed vertically, because as a result the lift body does not close the lead line in an unwanted manner.

It is advantageous if the lift body has a lesser density than the fuel, since the lift body, because of its buoyancy in the fuel, presses against the second constriction and thereby closes the line, so that fuel cannot get into the intake tube.

It is advantageous if the constriction or the lift body additionally has sealing elements, which facilitate sealing.

For guiding the lift body, the lead line advantageously has guide rails, which assure that the lift body will always optimally come to rest against the constriction, and that in normal operation, there is sufficient space available for an exchange of media upon changes in the intake tube pressure.

BRIEF DESCRIPTION OF THE DRAWING

Exemplary embodiments of the invention are shown in simplified form in the drawing and explained in further detail in the ensuing description.

Shown are

DESCRIPTION OF THE PREFERRED EMBODIMENTS

Figure 1:
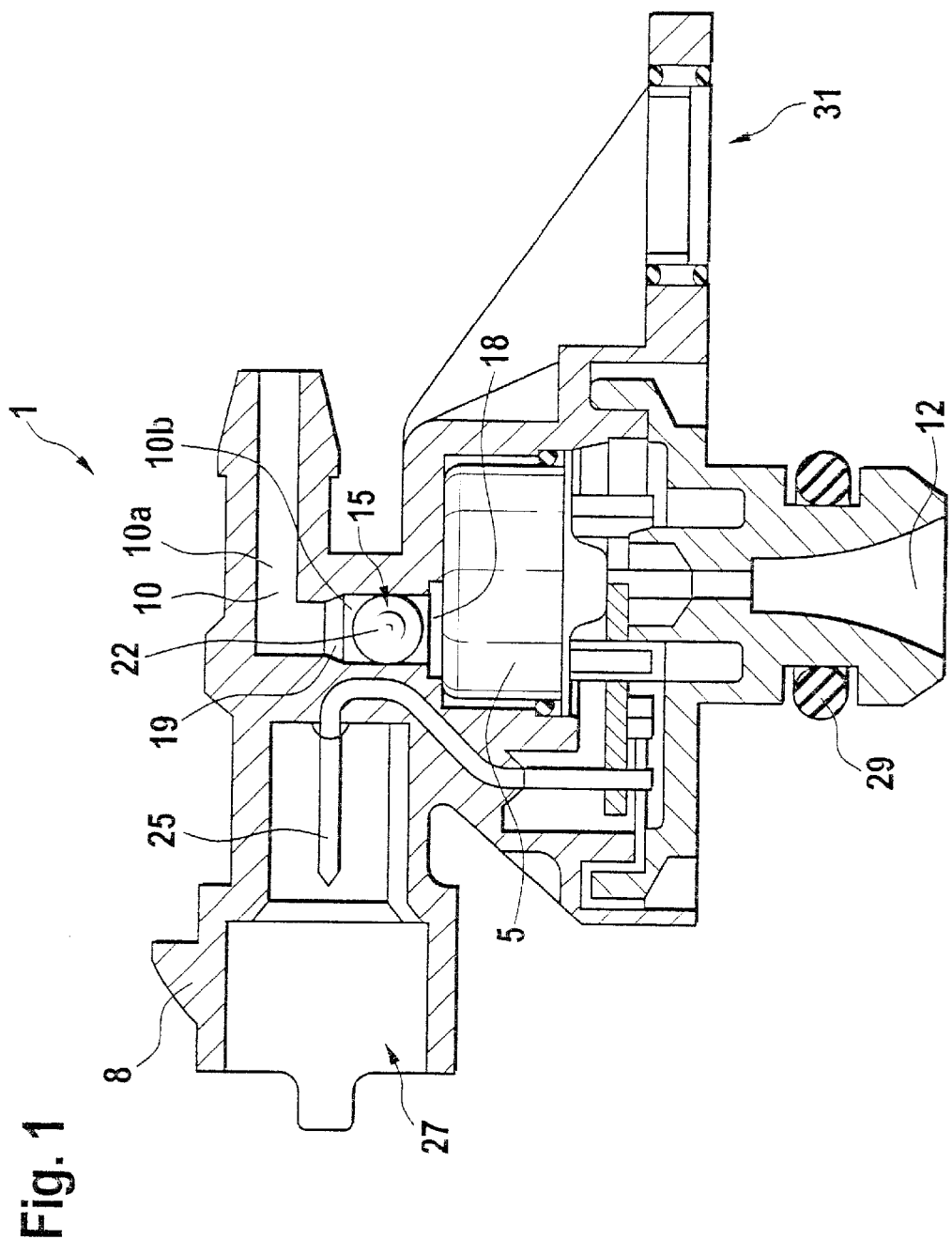
FIG. 1, a pressure sensor module of the invention.

FIG. 1 shows a pressure sensor module 1 according to the invention, which among other elements comprises a module housing 8, in which a sensor cell 5 is disposed at least in part. The sensor cell 5 for instance includes a sensor chip 3 (FIG. 3), which is capable of measuring a pressure or a differential pressure. Typically, this is a silicon-based micromechanical sensor, which has a diaphragm.

Connected to the sensor cell 5 are a first lead line 10, which for instance communicates with an intake tube of an internal combustion engine, and a second lead line 12, which communicates for instance with a fuel line.

The sensor chip 3 with its diaphragm disconnects the first lead line 10 and the second lead line 12 from one another, so that no medium from one lead line 10, 12 can enter the other lead line 12, 10.

For instance in the first lead line 10, in a partial region 10b, a valve 15 is disposed, which closes the first lead line 10 if the diaphragm breaks and thus disconnects the first lead line 10 and the second lead line 12 from one another, so that the medium from the second lead line 12 cannot get into the first lead line 10.

The valve 15 is for instance a partial region 10b of the first lead line 10, which has a first constriction 18 and a second constriction 19. The remainder of the lead line 10 is marked 10a.

A lift body 22, which forms the movable valve member of the valve 15, is disposed between the two constrictions 18, 19.

If the diaphragm disconnects the first lead line 10 from the second lead line 12, then the lift body 22 presses by its weight against the second constriction 18, but does not close the first lead line 10 in the process. That is, a pressure in the first lead line 10 acts on one side of the diaphragm, and a pressure from the second lead line 12 acts on the other side of the diaphragm, so that a differential pressure is measured.

The first constriction 18 is a perforated grid, for instance. The second constriction 19 is formed for instance by providing a decreasing cross section of the first lead line 10*b*. The lift body 22 is for instance a ball, cylinder or some other shape, which by pressing against the second constriction 19, which forms a valve seat, can close the lead line 10 and that has a smaller cross section than the lead line 10*b*, which for instance is round, between the two constrictions 18, 19.

If the diaphragm no longer disconnects the first lead line 10 and the second lead line 12 from one another, then the higher pressure in the second lead line 12, for instance, causes the lift body 22 to be pressed by the higher pressure in the second lead line 12 and the flowing medium against the second constriction 19, thus closing the first lead line 10, so that the first lead line 10 and the second lead line 12 are again disconnected from one another.

If the medium in the second lead line 12 is a liquid medium, such as a liquid fuel, and if this fuel, if the diaphragm has burst, reaches the lead line 10*b* through the first constriction 18, then the lift body experiences buoyancy, since the lift body 22 advantageously has a lesser density than the liquid fuel. The lift body 22 is pressed against the second constriction 19 by the buoyancy and by the higher pressure in the lead line 12.

The control of the valve 15 is thus effected without additional aids, since the medium in one lead line 12 and/or the pressure difference in the lead lines 10, 12 bring about a closure of the valve 15.

The pressure sensor module 1 further has electrical connection elements 25, which are part of a plug 27 that serves to connect it electrically to an external source of electrical energy and/or an external control unit. For instance, at least one lead line 10, 12 on its outer circumference has a sealing ring 29, which when the pressure sensor module 1 moves into a further component serves the purpose of sealing.

The pressure sensor module 1 furthermore has a fastening flange 31, which serves to fasten the pressure sensor module 1 to the component.

Figure 2A:
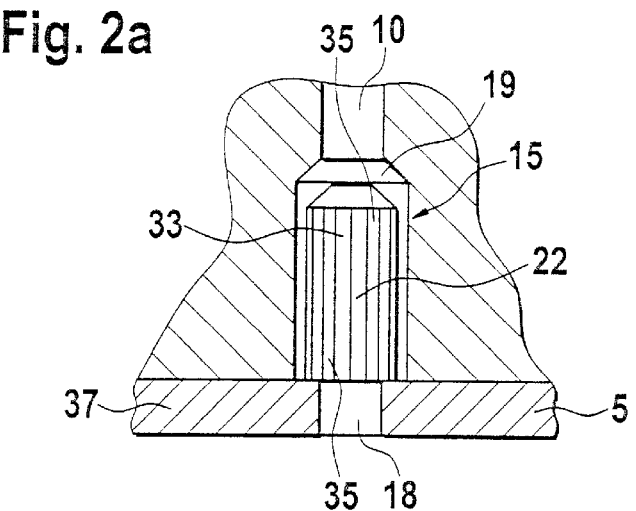
FIGS. 2a, 2b, a detail of further pressure sensor modules of the invention.

FIG. 2*a* shows a detail of FIG. 1 for a further exemplary embodiment of the invention.

It essentially shows a further version of the valve 15.

The first constriction 18 is formed for instance by an opening in the housing 37 (FIG. 3) of the sensor cell 5, which has a smaller cross section than the lift body 22.

The second constriction 19 is embodied, as in FIG. 1, by a reduction in the cross section of the first lead line 10*b*.

The lift body 22 is formed by an element 33 that has continuous longitudinal grooves 35. The longitudinal grooves 35 assure that communication from the first lead line 10 to the sensor cell 5 exists, even if an enveloping jacket face of the element 33 is identical to the cross section of the first lead line 10*b* between the two constrictions 18, 19.

For example, the lead line 10*b* has a round cross section in this region, and the lift body 22 is formed by a cylinder that has the corresponding continuous longitudinal grooves 35. The cylinder 33 rests partly directly against the lead line 10*b*, but because of the longitudinal grooves 35, a passage from the first lead line 10 to the sensor cell 5 is guaranteed. The cylinder 33 also closes the lead line 10, as already explained for FIG. 1, if the diaphragm has burst, and a face end, toward the constriction 19, of the cylinder 33 is adapted to the constriction 19; for instance, the face end and the constriction 19 are embodied conically.

Figure 2B:
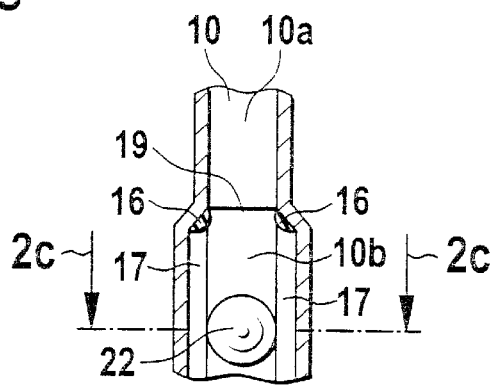

As the lift body 22, FIG. 2*b* shows a ball, which is guided by guide rails 17. A cylinder or some other shape can also be guided by the guide rails. The guide rails 17 assure that the ball will always optimally come to rest against the constriction 19, since the diameter of a circle defined by the free ends of the guide rails 17 is approximately equivalent to the outer diameter of the ball.

To facilitate sealing between the constriction 19 and the lift body 22, at least one sealing element 16, such as an encompassing rubber bead, is provided in the region of the constriction 19. The sealing elements 16 are elastically deformable, so that there is a large sealing face area.

The sealing element 16 can also be present on the lift body 22. As the lift body 22, FIG. 2*d* shows a ball that is enveloped by a sealing element 16.

Figure 2C:
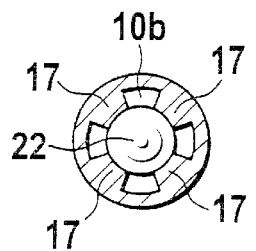
FIG. 2c, a section taken along the line A—A in FIG. 2b.
Figure 2D:
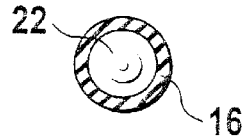
FIG. 2d, a further exemplary embodiment for a lift body.

FIG. 2*c* shows a section taken along the line A—A in FIG. 2*b*. The part of the lead line 10 through which the pressure from the lead line 10 can act on the diaphragm of the sensor chip 3 is formed by the space between the guide rails 17, which are for instance triangular in cross section or have the form of small rods.

Figure 3:
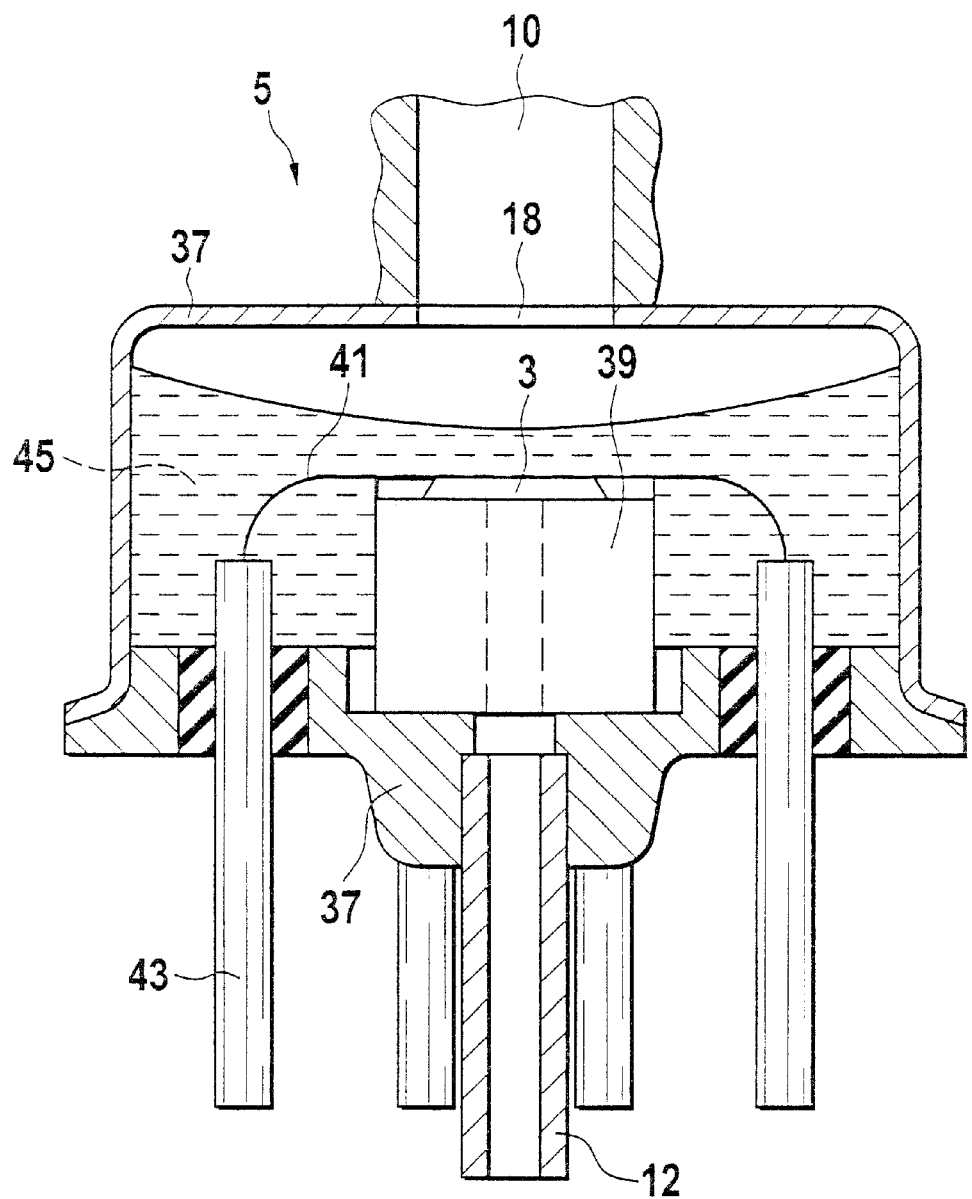
FIG. 3, a sensor cell that is built into a pressure sensor module of the invention.

FIG. 3 shows a sensor cell 5 of the kind used for instance in the pressure sensor module 1 of the invention. The sensor cell 5 has a sensor housing 37, in which the sensor chip 3 is disposed on a glass base 39. The sensor chip 3 is protected inside the sensor housing 37, for instance by a gel 45. The sensor chip 3 is connected by bond wires 41 to electrical sensor connection elements 43, which in turn are connected to the electrical connection elements 25. The housing 37 has an opening, which is disposed in the region of the first constriction 18 or ever, forms this constriction (FIG. 2), and which is connected to the lead line 10. The other side of the sensor chip 3 is connected to the lead line 12, as indicated by dashed lines.

What is claimed is:

1. A pressure sensor module for measuring a differential pressure, comprising at least a sensor chip for measuring a differential pressure, and a module housing, which has at least two lead lines that are disconnected from one another by the sensor chip, and in which lines different pressures are at least intermittently present, characterized in that in at least one lead line (10, 12), a valve (15) is disposed that closes this lead line (10, 12) when the sensor chip (3) no longer disconnects the lead lines (10, 12) from one another.

2. The pressure sensor module of claim 1, characterized in that the valve (15) is formed of at least two constrictions (18, 19) of one lead line (10, 12), a lift body (22) that is disposed movably in this lead line (10, 12), which lift body is disposed between the two constrictions (18, 19), which lift body rests on a first constriction (18), which lift body does not with its cross section close the lead line (10), and which lift body closes the lead line (10) by resting on a second constriction (19) when the sensor chip (3) no longer disconnects the lead lines (10, 12) from one another.

3. The pressure sensor module of claim 1,
characterized in that
the first constriction (18) is formed by a perforated grid.

4. The pressure sensor module of claim 2,
characterized in that
the lift body (22) is a ball, which has a smaller cross section than the lead line (10, 12).

5. The pressure sensor module of claim 2,
characterized in that
the lift body (22) is formed by an element (33) with longitudinal grooves (35).

6. The pressure sensor module of claim 1,
characterized in that
the pressure sensor module (1) has a first lead line (10) and a second lead line (12);
that the first lead line (10) is connected to an intake tube of an internal combustion engine;
that the second lead line (12) is connected to a fuel line; and
that the valve (15) is disposed in the first lead line (10).

7. The pressure sensor module of claim 2,
characterized in that
a longitudinal axis of the at least one part of the lead line (10, 12) in which the lift body (22) is disposed extends approximately vertically.

8. The pressure sensor module of claim 2,
characterized in that
the lift body (22) has a lesser density than the liquid fuel.

9. The pressure sensor module of claim 1,
characterized in that
the two lead lines (10, 12) are provided; and
that in one lead line (10, 12), at least intermittently, a pressure prevails that is greater than or equal to the pressure in the other lead line (12, 10).

10. The pressure sensor module of claim 2,
characterized in that
the lead line (10, 12) has guide rails (17) at least intermittently between two constrictions (18, 19).

11. The pressure sensor module of one or more of claims 2,
characterized in that
the lift body (22) has at least one sealing element (16).

12. The pressure sensor module of claim 2,
characterized in that
at least one sealing element (16) is present in the region of the constriction (18, 19) at which the lift body seals off the lead line (10, 12).

\* \* \* \* \*